Nov. 10, 1964  J. HERMANN ETAL  3,156,185
TRIGGERING DEVICE FOR A MOVABLE BODY
Filed Dec. 12, 1961  2 Sheets-Sheet 1

Inventors:
JOACHIM HERMANN
HORST SENGER
BY: McGlew and Toren
ATTORNEYS

Inventors:
JOACHIM HERMANN
HORST SENGER
BY: M Gleiss and Toren
ATTORNEYS

United States Patent Office 3,156,185
Patented Nov. 10, 1964

3,156,185
TRIGGERING DEVICE FOR A MOVABLE BODY
Joachim Hermann, Erminoldstrasse 83, Munich 8, Germany, and Horst Senger, Forststrasse 4, Ottobrunn, near Munich, Germany
Filed Dec. 12, 1961, Ser. No. 158,658
15 Claims. (Cl. 102—1)

This invention relates in general to actuating devices for movable objects and in particular to a new and useful device for triggering the operations or activities of a movable body, particularly a flying body.

The present invention is particularly directed to the control of the flying characteristics, maneuverability, warhead arming, carrier illumination, etc. of a flying body such as a missile. The invention finds application in connection with a flying body which includes a connecting member which is pulled off during the movement of the body away from its launching station.

Prior to the present invention it has been known to provide electrically operated timing devices, relays, etc. for flying bodies which are operated either directly through a control cable or by means of remote radio control. A difficulty in the operation of such devices is that in some instances they are not reliable, and they cannot be easily operated to effect controlled commands to the missile at predetermined locations along its flight path. In addition the equipment required for such control operation is expensive and cannot be easily employed in a manner to function with reliability and uniformly at the times required.

In accordance with the present invention at least one activity, control or procedure is triggered at the movable body when a predetermined length of a connecting cable is drawn off from the flying body as it is moved. The connecting cable is advantageously unwound from a reel supply within the missile by anchoring the end of the cable at the launching station. Selected coils of the winding are connected to various operating mechanical or electrical control systems and the systems are activated when the particular triggering coil of the connecting cable is pulled off its reel support during the movement of the movable body. By this means it is possible to trigger or initiate electrical or mechanical commands to the missile which are dependent on the distance traveled by the movable body or dependent upon the time after launching, etc. This simple expedient is far more inexpensive and much more reliable in operation than the complicated controls known heretofore. By selecting the location of the connecting cable which will actuate the triggering mechanism, the control devices can be accurately triggered in accordance with the distance traveled by the movable body as determined by the length of cable which has been played out. This same means will provide an accurate means for triggering a control circuit for a mechanical device in accordance with the length of time of travel of the movable body after it has been launched. Since the control cable will normally be stored within the missile in a winding anyone of the windings may be selected to initiate one or a plurality of triggering operations. Thus operations, controls, etc. may be initiated in a timed sequence based upon distance of the travel of the missile or movable body from its launching station. The control cable or connecting member may advantageously include a cord, wire, or cable which connects the moving body with the launching area and which is advantageously stored within the moving body by winding it in either a ball, or coil therein. In some instances, it is desirable that the cable be of a length so that the entire length will soon be played out and the cable separate from the missile or movable body during its path of movement.

Accordingly it is an object of this invention to provide movable body actuating triggering mechanism.

A further object of the invention is to provide an arrangement for triggering the operations of a movable body, such as a flying body, having a connecting cable with portions stored on the movable body for release during movement thereof, which includes means connected to the connecting cable for the body at a selected location along the length for triggering a control element when the selected location on the cable is released from the flying body.

A further object of the invention is to provide a movable body construction which includes means for winding a connecting cable therein and means connected to a selected winding of the connecting cable for triggering a control operation at the movable body.

A further object of the invention is to provide a flying body with a connecting cable wound and stored therein having an end secured to the ground at the launching station, and including a control device having triggering means thereon connected to a winding of the cable and wherein the triggering means is actuated when the selected winding is pulled off the flying body during the flight thereof.

A further object of the invention is to provide a flying body construction including a warhead setting mechanism which is triggered by the unreeling of a connecting cable to the ground from the missile during its flight.

A further object of the invention is to provide a missile having illumination means carried thereby which is actuated by a control circuit connected when a turn of a connecting cable from the missile to the launching station is reeled off during the flight of the missile.

A further object of the invention is to provide a triggering device for a movable body which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
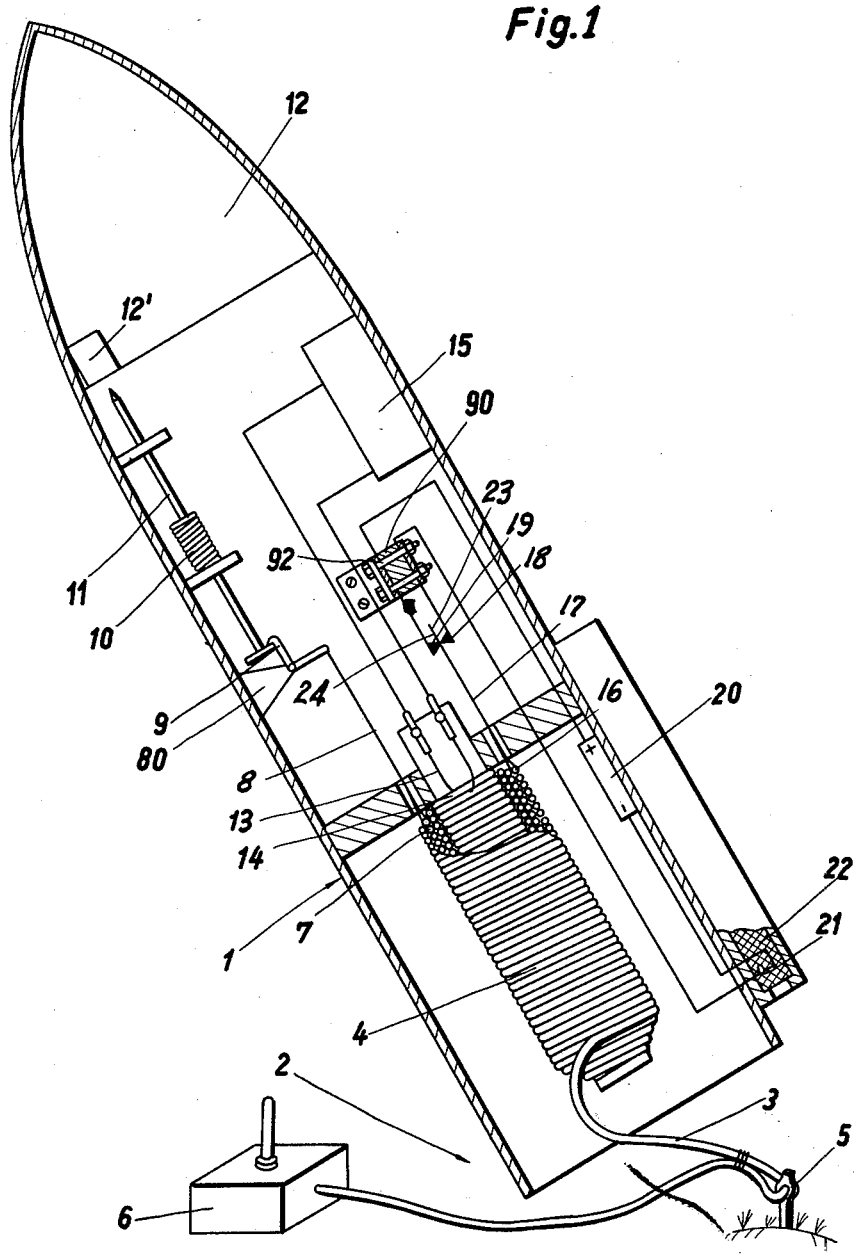
FIG. 1 is a somewhat schematic transverse section of a flying body constructed in accordance with the invention indicating the connecting cable anchored at a launching station and connected to a signal generator.

Referring to the drawings in particular, the invention embodied therein as indicated in FIG. 1 includes a flying body generally designated 1 which is connected to the launching station 2 by means of a connecting member 3 which can be pulled off or drawn off from a reel or coil 4 mounted within the flying body. The connecting member 3 may be of any suitable material such as cord, wire, cable, etc. In some instances, as in the embodiment indicated in FIG. 1, the connecting member is a control line having electrical control conduits therein which, by means of an armature or securing stake 5 is anchored to the launching area 2. The control cable 3 is also connected at its opposite end to an interior control (not shown) on the missile which receives signals from a signal generator 6 secured to the control cable at the launching station.

In accordance with the invention, other activities, controls, etc. which are independent from the signal given by the generator 6 are triggered after the launching of the missile 1 and in dependence on a predetermined distance of missile travel indicated by the pulling off of a preselected winding of the control or connecting cable 3 from the flying body or missile 1.

As indicated in FIG. 1, a winding 7 is shown in section which in the embodiment illustrated is located at the interior of a reel or coil 4. A control member or tearable member 8 such as a connecting cord, thin wire, or thread is looped around the winding 7 and is connected at its other end to a lever 9 which is pivotally mounted on a bracket 80 at the interior of the missile. The lever 9 includes a latching arm portion which holds an impact bolt 11 downwardly against the force of a compression spring 10. When the winding 7 is pulled off during the flight of the missile the tearable member 8 will rupture and the lever 9 will be rocked to release the impact bolt 11. The impact bolt 11 is disposed to advance to contact mechanism 12' of a warhead 12 situated in the forward head of the flying body to release the safety mechanisms for the explosive charge in either an electrical or mechanical manner.

In accordance with a further feature of the invention, a further device for releasing an activity includes a looped member 13 which is formed by an electric conductor which embraces a coil 14 of the winding. The conductor element loop 13 is situated in a circuit of a control device 15 and when the coil 14 is unwound it breaks the conductor loop 13 to interrupt the circuit. The control device 15 is advantageously any conventional electrical device which may be arranged in a circuit or system, for example, for causing the destruction of the flying body 1, its rapid descent, or means for resetting a missile flight control to another signal transmitter or generator in order to operate the missile under a new control arrangement.

By arranging reversible loops at various locations on the windings or coils 4 the release or triggering of an activity can be performed at various locations along the path of travel of the missile or movable body or effectively at various times after the launching of such missile. In another arrangement for releasing an activity as indicated in FIG. 1, there is shown a member 17 having a loop which extends around a winding coil 16 of the winding 4. The contacting surfaces of the member 17 are adhesively glued to each other. The member 17 advantageously consists of a stripped shaped insulating material and the free end of the loop is clamped between spring loaded electrical contacts 18 and 19 and prevents electrical connection therebetween. When the winding or coil 16 is pulled off the loop portion of member 17 which is secured to the winding is pulled out from between the contacts 18 and 19 and closes an electrical circuit to which these contacts are connected.

As indicated in the drawing, the contacts 18 and 19 are connected to a battery 20 and a melting wire 21 which is located within an illumination charge 22 carried on the exterior of the missile 1. When the contacts 18 and 19 are closed by removal of the member 17 from between them, the illuminating charge 22 is ignited by melting of the melting wire 21 therein. The illuminating charge is provided to indicate to the ground crew the path or distance which has been traveled by the flying body in order to permit the easy observation of this flying path. The member 17, according to a feature of the invention, is provided with opposite roughened surfaces 23 and 24. A coating may be provided on these surfaces which consist of corundum, silicon carbide or similar hard material. This coating removes, upon pulling out of the loop end thereof by the winding 16, any insulating coatings, oxides, dirt, etc. which may have formed on the contacts due to prolonged storage. The provisions of the friction coatings on the member 17 in this manner tend to insure that the electrical contacts will operate without fault. In the embodiment illustrated the contacts 18 and 19 are mounted on block elements 90 which are secured together by bolts 92.

Figure 2:
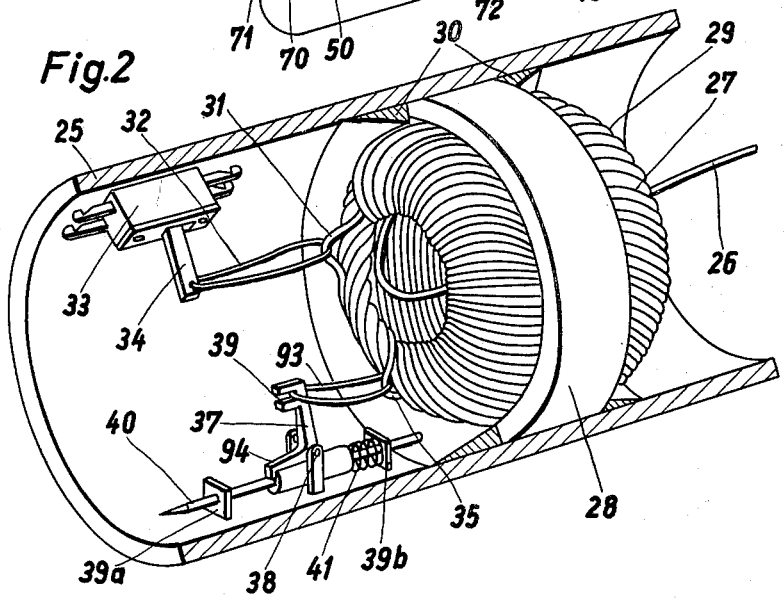
FIG. 2 is a transverse section of another embodiment of flying body constructed in accordance with the invention.

In FIG. 2, there is indicated another section or portion of a movable body such as a missile. A cylindrical jacket 25 is provided which is indicated in longitudinal section. A connecting member, such as a cord 26 which may be moved off from a ball supply 27 thereof during the movement of the missile flight is mounted within the cylindrical jacket in the center of a ring 28 which is advantageously made of a material such as foamed plastic. The windings 29 of the ball 27 are lightly glued to each other and at the same time the ring 28 is adhesively connected to the ball 27. The ball is further held in position by means of beads 30 which are formed at each end of the ring 28 and secured to the jacket 25. As indicated, the cord 26, having a free end which is secured at the launching station, is pulled from the interior of the ball during the flight of the missile.

In accordance with this feature of the invention, a winding 31 of the ball 27 is embraced by a loop 32 which is made of a material which tears easily and which will be torn upon pulling off of the winding 31 during the flight of the missile. A lever arm member 34 of an electrical switch 33 is secured to the loop element 32 and the lever is thrown to an opposite position to actuate the switch when the winding 31 is pulled off. In the embodiment illustrated the switch 32 is advantageously a two-pole electric reversing switch which is connected to a suitable circuit for controlling the operation of various activities within the missile.

As indicated in FIG. 2, a further winding 35 is embraced by a loop 93, which is also directed around a forked end 39 of a release lever 37. The release lever 37 includes a dogging arm 94 which holds an impact bolt 40 against movement in a direction to the left indicated in FIG. 2 by means of a compression spring 41 which is held by a bearing member 39b at one end and biased against the impact bolt 40 at its opposite end. The bearing member 39b is rigidly connected to the jacket 25. When the lever 37 is actuated the bolt 40 is moved in a direction toward the left to actuate mechanism in a manner similar to the bolt 11 in FIG. 1.

Figure 3:
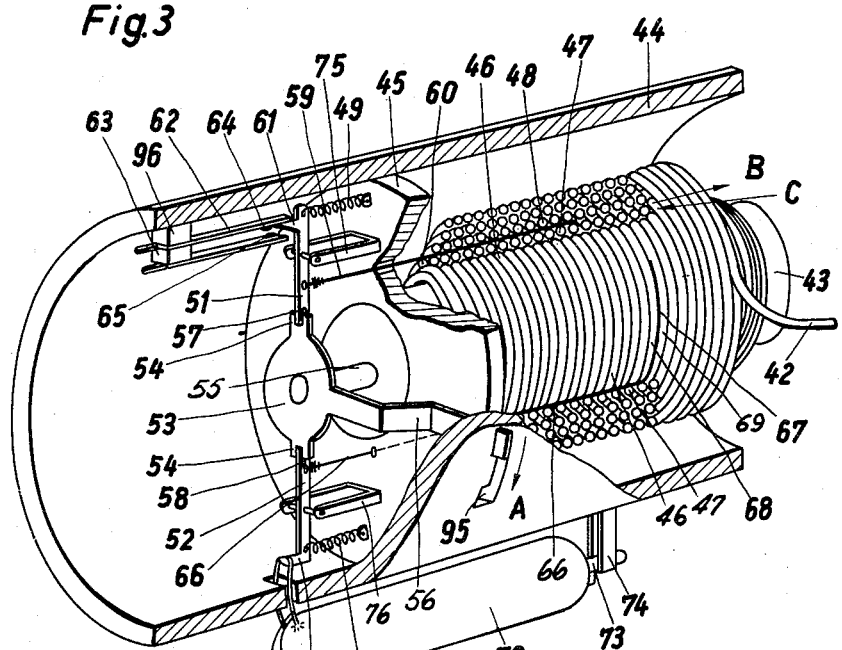
FIG. 3 is a transverse section of still another embodiment of flying body construction in accordance with the invention.

In FIG. 3 another embodiment of the device for releasing activities of a movable body is indicated. In this embodiment, a connection member which can be drawn off, for example, a cable 42 is wound around a reel body 43. The reel body 43 is secured in the stern or tail of a moving body, for example, a cylindrical flying body 44. The reel body 43 is secured to a disc or reel flange 45 which is freely fitted within the interior walls of the cylindrical body 44. Between each two layers 46, 47 and 47 and 48 of the winding, there are introduced control member means including spring loaded elements or bodies 59 and 66 which extend substantially parallel to the longitudinal axis of the winding of the connecting member 42. The bodies 59 and 66 are pretensioned by springs 49 and 50 which urge the outer ends of lever members 51 and 52 respectively in a direction toward the reel flange 45. The inner ends tend to be rocked around pivot members supported on brackets 75 and 76 secured at diametrically opposite ends on the reel flange 45, and hence to tension the members 59 and 66 which are secured to such respective ends.

A disc 53 having projecting segments 54 at diametrically opposite ends thereof is rotatably mounted on a shaft 55 which projects from the reel flange 45. During the mounting and during transportation of the flying body, the segments 54 are arranged in the manner indicated to engage into the slots 57 and 58 of the double armed lever 51 and 52 respectively. In this manner they release the inserted bodies 59 and 66 from the tension of the springs 49 and 50 respectively.

A lever 56 is secured to the disc 53 and it includes a projecting portion which extends through a slot 95 on the exterior of the cylindrical flying body 44 for manipulation by an operator. The lever 56 is rocked mechanically upon launching or shortly prior to launching of the flying body in the direction of the arrow A in order to release the arrested two arm levers 51 and 52 and to effect the tensioning of the inserted members 59 and 66 by the springs 49 and 50 respectively. The inserted bodies 59 and 66 engage the levers 51 and 52 adjacent the slots 57 and 58.

Upon drawing off of the layer 48 of the rear winding in the direction of the arrow B, the inserted body 59 is first freed upon pulling off the first winding 60 of the subsequent layer 47 which is pulled off in the direction of the arrow C. Since the thread 59 is pretensioned by the spring 49, it releases the lever 51 and permits rocking about the pivot of the brackets 75. A latching nose 61 releases a spring contact 62 of an electrical switch 63 to cause contact portions 64 and 65 to close a circuit in a control (not shown). The springs 62 are advantageously mounted on a cylindrical member 44 by means of blocks 96. The inserted body 59 may be a thread, a rigid wire, a rod, a band or strip.

The additional inserted member 66 extends along an axial direction in respect to the winding for a great portion of its length and then is angled off and extends parallel to the windings 68 and 69. When the windings 68 and 69 are drawn off the thread 66 is released from the winding permitting lever 52 to rock about the pivot of the bracket 76 and cause a latching end or nose 70 to clear a holding stirrup 71 of a body 72 to release it. The body 72 is suspended on the cylindrical body 44 by means of a U-shaped bracket 74 into which is fitted a small diameter projecting nose 73 of the body 72.

The invention may be advantageously used with flying bodies particularly such flying bodies which are controlled via wires or connecting cables. In accordance with the invention and for the security and safety of personnel who may be in the direct vicinity of the launching area, the igniting means for an explosive warhead of the flying body will only be released or the safety devices will only be released after the flying body has already traveled a predetermined distance as measured by the paying off of the connecting cable. In addition, a pyrotechnical illumination charge can be ignited at the flying body at any time during its course of flight. The distances of missile travel may be accurately regulated so that the desired operations will be triggered at pre-selected times or distances from the launching site of the missile. The signals which may be transmitted upon the triggering in the manner mentioned may, for example, be provided to inform ground crews either acoustically, optically, or electrically in respect to the flying conditions of the missile.

It should be appreciated that the present invention relates principally to a mechanism for triggering certain control impulses in respect to a flying body or missile which is remotely controlled from the ground by a connecting cable. Although the propelling means for the flying body has not been indicated, a suitable drive device such as a thrust engine of a type well known in the art is employed, for example as shown in German Patent 1,019,184, which indicates a wire spooling device for the remote guiding of missiles which includes an engine which is contained centrally of the spool. Such an arrangement, of course, may be employed in the present case.

While specific embodiments of the invention have been shown and described in detail to illustrate the application of the inventive principles, it will be understood that the invention may be embodied otherwise without departing from such principles.

What is claimed is:

1. A device for triggering activities of a flying body having propulsion means, such as a rocket, remotely guided by a control cable, comprising a rocket housing, means for coiling said control cable in said housing, a control cable stored on said coiling means and adapted to have one end secured at a launching station and to be pulled out from the rocket housing during movement thereof, said control cable being an electrical transmission cable, at least one control member stored on the rocket housing and connected to a coiled portion of said control cable intermediate the length thereof and movable with said control cable only when the particular coiled portion of the control cable at the location of the connection in said rocket housing is pulled out from the rocket housing, and means on said rocket housing connected to said control member and actuated by movement thereof.

2. A device according to claim 1, wherein said means connected to said control member includes a displaceable bolt, means urging said bolt into an actuated position, and means latching said bolt to prevent movement by said urging means, said latching means being connected to said control member and being movable with said control member to release said bolt.

3. A device according to claim 1, wherein said means connected to said control member includes a control device including an electrical circuit, said control members being connected to said circuit and being movable to change said circuit.

4. A device according to claim 3, wherein said circuit includes a loop of conductive material forming said control member which is looped around said control cable.

5. A device according to claim 3, wherein said electrical circuit includes a pair of spaced contacts, said control member being of insulation material and disposed between said contacts but being movable away therefrom with said control cable to electrically connect such contacts.

6. A device according to claim 3, including an illuminating charge actuatable by said control circuit.

7. A device according to claim 6, wherein said illuminating charge includes a melting wire therein, said circuit being connected to said melting wire to melt the same and ignite said illuminating charge.

8. A device according to claim 1, including a ring element adapted to be secured within said movable body, said control cable being wound in a ball and connected within said ring element, said control member being a loop element looped around a portion of said control cable, said means operated by said control element including a switch.

9. A device as claimed in claim 5, said control member having roughened surfaces for removing disturbing coatings from said contacts upon movement relative thereto.

10. A device for triggering activities of a rocket remotely guided by a control cable, including a rocket housing, spooling means on said housing for storing a length of control cable, a control cable stored on said spooling means and coiled therearound and having a free end anchored separately from said rocket at the ground, said control cable being an electrical transmission cable, said spooling means for storing said control cable permitting paying off of said control cable during movement of said missile, at least one control member in said housing connected to a coil of said control cable intermediate its length at the location of said storing means at a predetermined location away from its free end on said rocket housing and movable upon paying off of said control cable, and means on said rocket disposed in a position to be operated by movement of said control member upon paying off of said control cable.

11. A device for triggering activities of a missile remotely guided by a connecting cable, including a missile housing, means on said housing for storing a length of control cable, a control cable stored on said spooling means and having a free end anchored separately from said missile, said means for storing said control cable permitting paying off of said control cable during movement of said missile, at least one control member in said housing connected to said control cable at the location of said storing means at a predetermined location from the free end of said cable and movable upon paying off of said control cable, control means disposed in a position to be operated by movement of said control member upon the paying off of said control cable, said control means including a pivotal lever member having one arm connected to said control member, means biasing the opposite arm of said lever member to tend to pull said control member out of the coils of said control cable, and an electrical switch having two spaced contact arms, one of said contact arms being latched by said lever, said lever being movable upon release of said control member by paying off of said control cable to release said contact arm for engagement with the other of said contact arms.

12. A device for triggering activities of a missile remotely guided by a control cable, including a missile housing, a reel on said housing for storing a length of said control cable, a control cable stored on said means and having a free end anchored separately from missile, said means for storing said control cable permitting paying off of said control cable during movement of said missile, a disc element arranged on said missile transversely to said reel, a pair of levers pivotally mounted on said disc element at diametrically opposite locations thereon each including an inner arm portion, first and second control elements connected to respective ones of said inner arm portions of said levers, said levers including outer arm portions, means to bias said outer arm portions to tend to rotate said levers, said control elements being embedded in a winding of said control cable and holding said levers against rotation by said biasing means, said levers being connected at their outer ends to an activity for triggering the activity upon the release of said first and second cable control elements from the windings of said control cable.

13. A device according to claim 12, including means mounted on said reel to anchor said levers against rotation.

14. A device according to claim 12, wherein said means include a rotatable plate, a handle connected to said plate and manually movable to permit rotation of said plate and selective release and engagement of said levers.

15. A device for the triggering of events at a flying body having propulsion means such as a rocket which is remotely guided through a control cable which is connected to the rocket from the ground, comprising means on said rocket for spooling said control cable thereon, separate triggering means on said missile for initiating separate activities at said missile, said control cable adapted to be connected at its opposite end to a stationary element on the ground and for pulling out from such spooling means during the flight of said missile, said control cable including a plurality of turns extending around said spooling means, a plurality of control members each arranged in contact with a respective turn of said control cable on said spooling means at spaced locations along the length of said control cable and connected to said triggering means and being movable upon pulling off of the associated turn of said control cable to actuate said triggering means, the tensile strength of said control cable being greater than the force required to operate said triggering means.

References Cited in the file of this patent

UNITED STATES PATENTS

| | | |
|---|---|---|
| 1,181,190 | Welton | May 2, 1916 |
| 1,229,170 | Troje | June 5, 1917 |
| 1,340,546 | Keeran | May 18, 1920 |
| 2,228,120 | Koehler | Jan. 7, 1941 |
| 2,376,227 | Brown | May 15, 1945 |
| 2,826,120 | Lang et al. | Mar. 11, 1958 |

FOREIGN PATENTS

| | | |
|---|---|---|
| 248,777 | Great Britain | July 22, 1926 |
| 1,019,184 | Germany | Nov. 7, 1957 |
| 1,233,893 | France | May 9, 1960 |